US010876511B2

(12) United States Patent
Badger et al.

(10) Patent No.: US 10,876,511 B2
(45) Date of Patent: Dec. 29, 2020

(54) METHODS AND SYSTEM FOR AUTOMATICALLY STOPPING AN ENGINE

(71) Applicant: Ford Global Technologies, LLC, Dearborn, MI (US)

(72) Inventors: Justin Badger, Plymouth, MI (US); Kenneth Frederick, Dearborn, MI (US); Robert Hurley, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/895,416

(22) Filed: Jun. 8, 2020

(65) Prior Publication Data

US 2020/0300208 A1 Sep. 24, 2020

Related U.S. Application Data

(62) Division of application No. 16/226,408, filed on Dec. 19, 2018, now Pat. No. 10,746,150.

(51) Int. Cl.
*F02P 5/00* (2006.01)
*F02N 11/08* (2006.01)
*B60W 10/06* (2006.01)

(52) U.S. Cl.
CPC ......... *F02N 11/0818* (2013.01); *B60W 10/06* (2013.01); *F02N 2200/023* (2013.01); *F02N 2200/0801* (2013.01); *F02N 2200/101* (2013.01); *F02N 2200/102* (2013.01); *F02N 2300/102* (2013.01)

(58) Field of Classification Search
CPC ........ F02P 5/00; F02P 5/04; F02P 5/14; F02P 5/045; F02P 5/1455; F02P 5/1504; F02P 5/1516
USPC ............ 123/406.11, 406.26, 406.44, 406.45, 123/406.55
See application file for complete search history.

(56) References Cited

U.S. PATENT DOCUMENTS

2018/0163614 A1* 6/2018 Yerace ................ F02D 41/1446
2018/0334977 A1* 11/2018 Hattar ................ F02D 41/0245
2020/0200136 A1* 6/2020 Badger ............... F02N 11/0818

* cited by examiner

Primary Examiner — John Kwon
(74) Attorney, Agent, or Firm — Geoffrey Brumbaugh; McCoy Russell LLP

(57) ABSTRACT

Systems and methods for operating a spark ignition engine that includes a particulate filter in the engine's exhaust system are described. In one example, a threshold temperature at which the spark ignition engine may be automatically stopped is adjusted according to an amount of soot that is stored in the particulate filter.

20 Claims, 5 Drawing Sheets

METHODS AND SYSTEM FOR AUTOMATICALLY STOPPING AN ENGINE

CROSS REFERENCE TO RELATED APPLICATION

The present application is a divisional of U.S. patent application Ser. No. 16/226,408, entitled "METHODS AND SYSTEM FOR AUTOMATICALLY STOPPING AN ENGINE," filed on Dec. 19, 2018. The entire contents of the above-referenced application are hereby incorporated by reference in its entirety for all purposes.

FIELD

The present description relates to methods and a system for automatically stopping an engine.

BACKGROUND AND SUMMARY

Direct injection spark ignition engines provide benefits over port injected spark ignition engine. For example, direct injection spark ignition engines may provide high levels of charge cooling so that they may operate with more spark advance and generate less NOx as compared to a similar port injected engine operating at similar speeds and loads. However, direct injection spark ignition engines may also generate more soot than a port injected engine at some engine operating conditions. For example, direct injection engines may generate greater amounts of soot at lower engine temperatures. The soot may be trapped in a particulate filter where it may be oxidized at a later time. However, some soot may pass through the particulate filter during conditions when the engine may be generating higher levels of soot. Therefore, it may be desirable to provide a way of limiting conditions where the engine may produce larger amounts of soot so that instances of higher soot flow through the particulate filter may be reduced.

The inventors herein have recognized the above-mentioned issues and have developed an engine operating method, comprising: adjusting an automatic engine stopping engine temperature threshold as a function of an amount of soot stored in a particulate filter via a controller; and automatically stopping an engine responsive to an engine temperature being greater than or equal to the automatic engine stopping engine temperature threshold.

By adjusting an automatic engine stopping engine temperature threshold as a function of an amount of soot stored in a particulate filter, it may be possible to provide the technical result of reducing soot flow through a particulate filter during conditions when an engine generates higher amounts of soot. In particular, if an amount of soot stored in a particulate filter is low, then the automatic engine stopping engine temperature threshold may be raised so that the engine may be automatically stopped only when engine temperature is relatively high. On the other hand, if the amount of soot stored in the particulate filter is high, then the automatic engine stopping engine temperature threshold may be reduced so that the engine may be automatically stopped at lower engine temperatures. The inventors herein have recognized that the efficiency of the particulate filter to trap soot increases as the amount of soot stored within the particulate filter increases. Therefore, an engine that includes a particulate filter that has trapped a threshold amount of soot may be stopped at lower temperatures without emitting higher levels of soot. This may allow engine fuel consumption to be reduced. If the same engine includes a particulate filter that has trapped less than a threshold amount of soot, the engine may not be automatically stopped until the engine has reached a higher temperature where the engine produces less soot so that engine emissions may be reduced.

The present description may provide several advantages. In particular, the approach may reduce engine soot emissions. Further, the approach may improve engine fuel efficiency by allowing the engine to be selectively deactivated. In addition, the approach may choose a type of fuel injection that conforms to the operating state of the particulate filter and engine emissions objectives so that engine emissions may be maintained at lower levels.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 4:
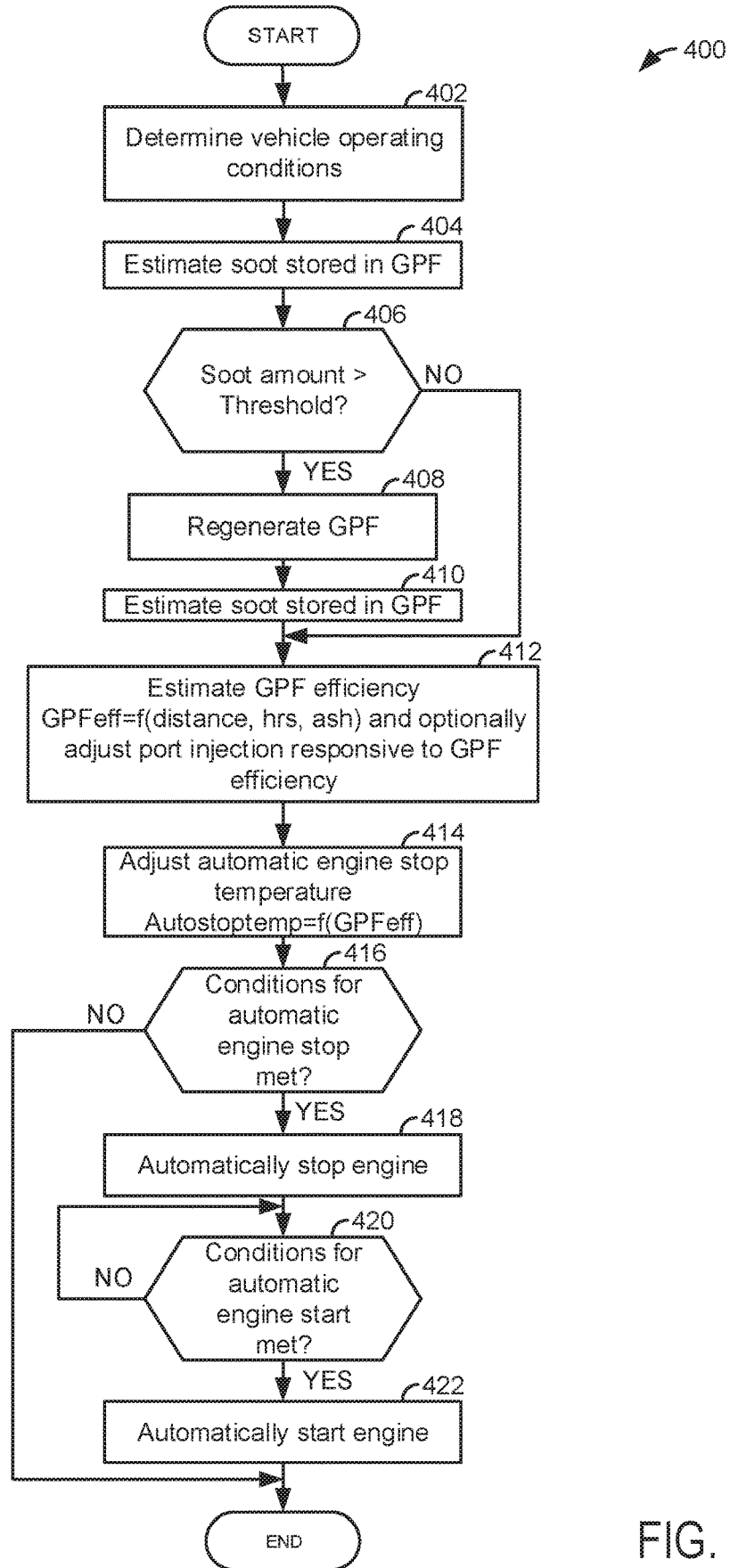
FIG. 4 shows a method for operating a driveline that includes an engine and an ISG.
Figure 5:
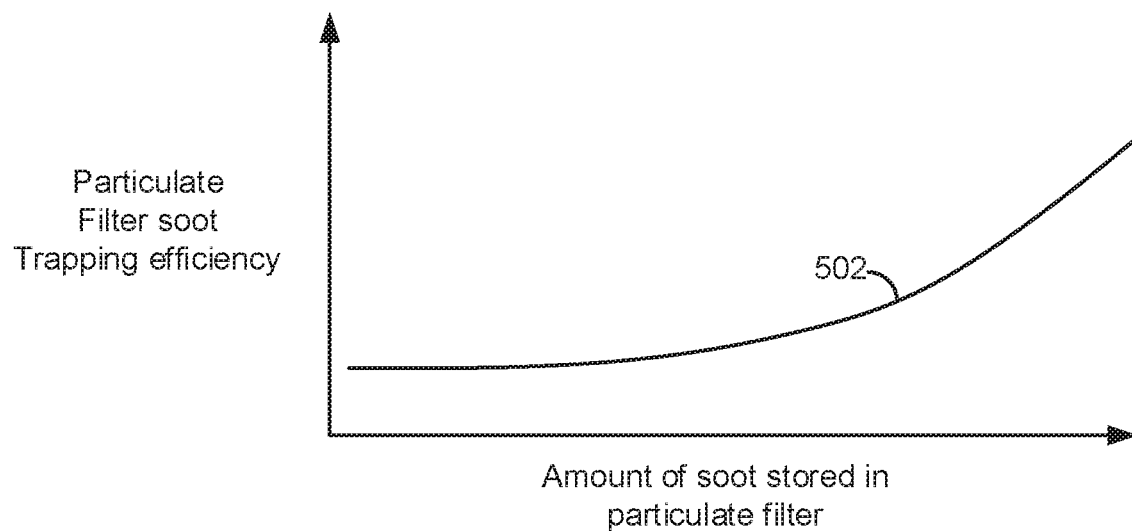
FIG. 5 shows a plot of a relationship between an amount of soot trapped in a particulate filter and soot trapping efficiency of a particulate filter.
Figure 6:
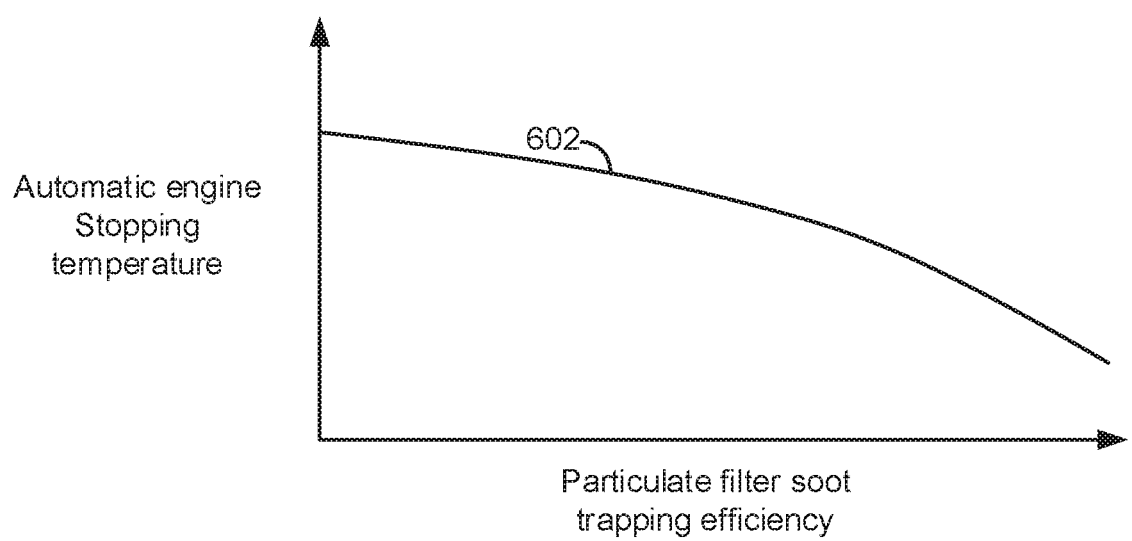
FIG. 6 shows a plot of automatic engine stopping temperature as a function of soot trapping efficiency of a particulate filter.

The present description is related to operating an engine that includes a particulate filter. The engine may be of the type shown in FIG. 1. The engine may be included in a driveline of a hybrid vehicle as is shown in FIG. 2. The engine may be operated according to the sequence shown in FIG. 3. The sequence of FIG. 3 may be provided via the system of FIGS. 1 and 2 and the method of FIG. 4. A flowchart of a method for operating an engine with a particulate filter is shown in FIG. 4. A plot of a relationship between an amount of soot trapped in a particulate filter and soot trapping efficiency of a particulate filter is shown in FIG. 5. Finally, a plot of automatic engine stopping temperature as a function of soot trapping efficiency of a particulate filter is shown in FIG. 6.

Figure 1:
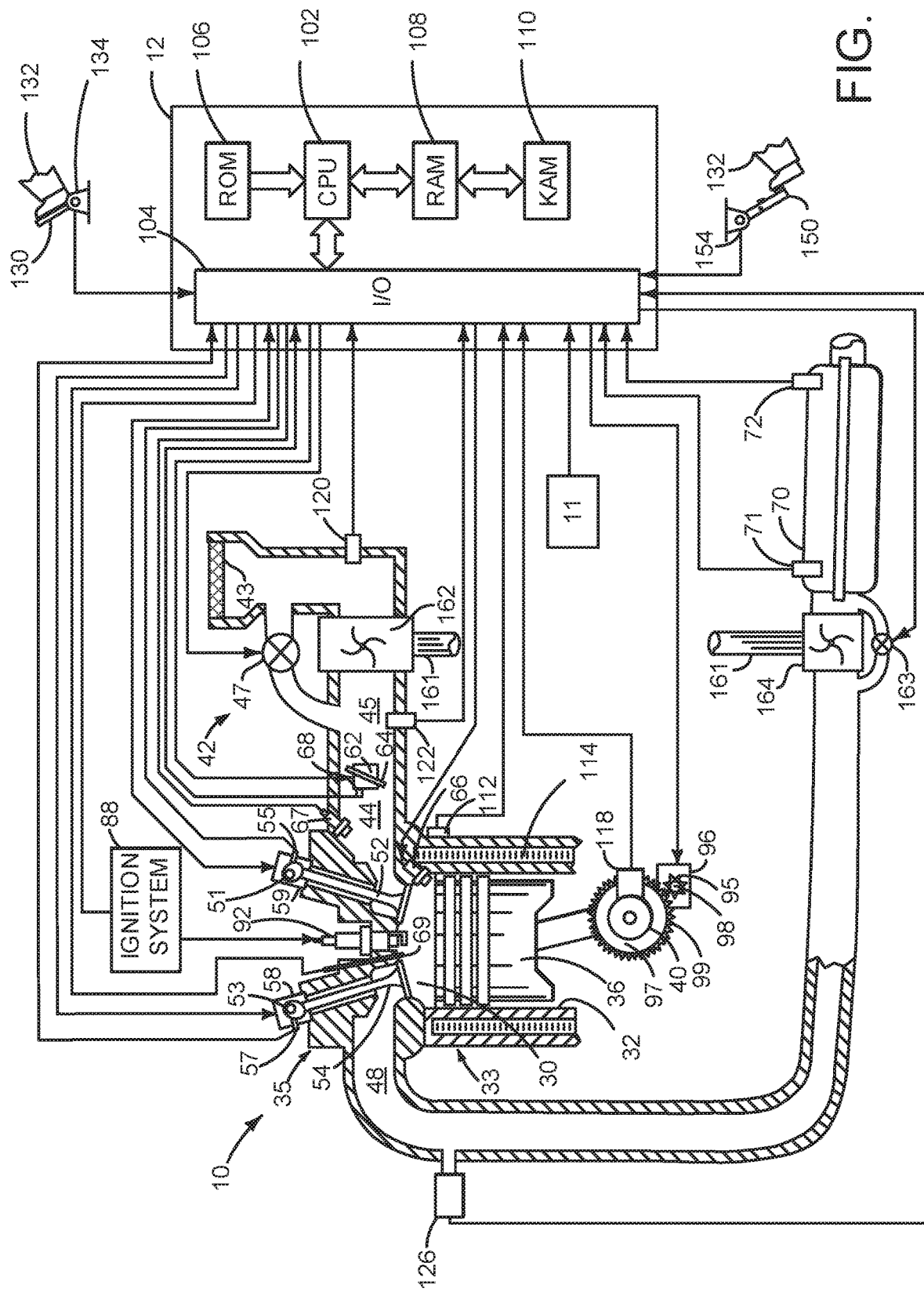
FIG. 1 is a schematic diagram of an engine.
Figure 2:
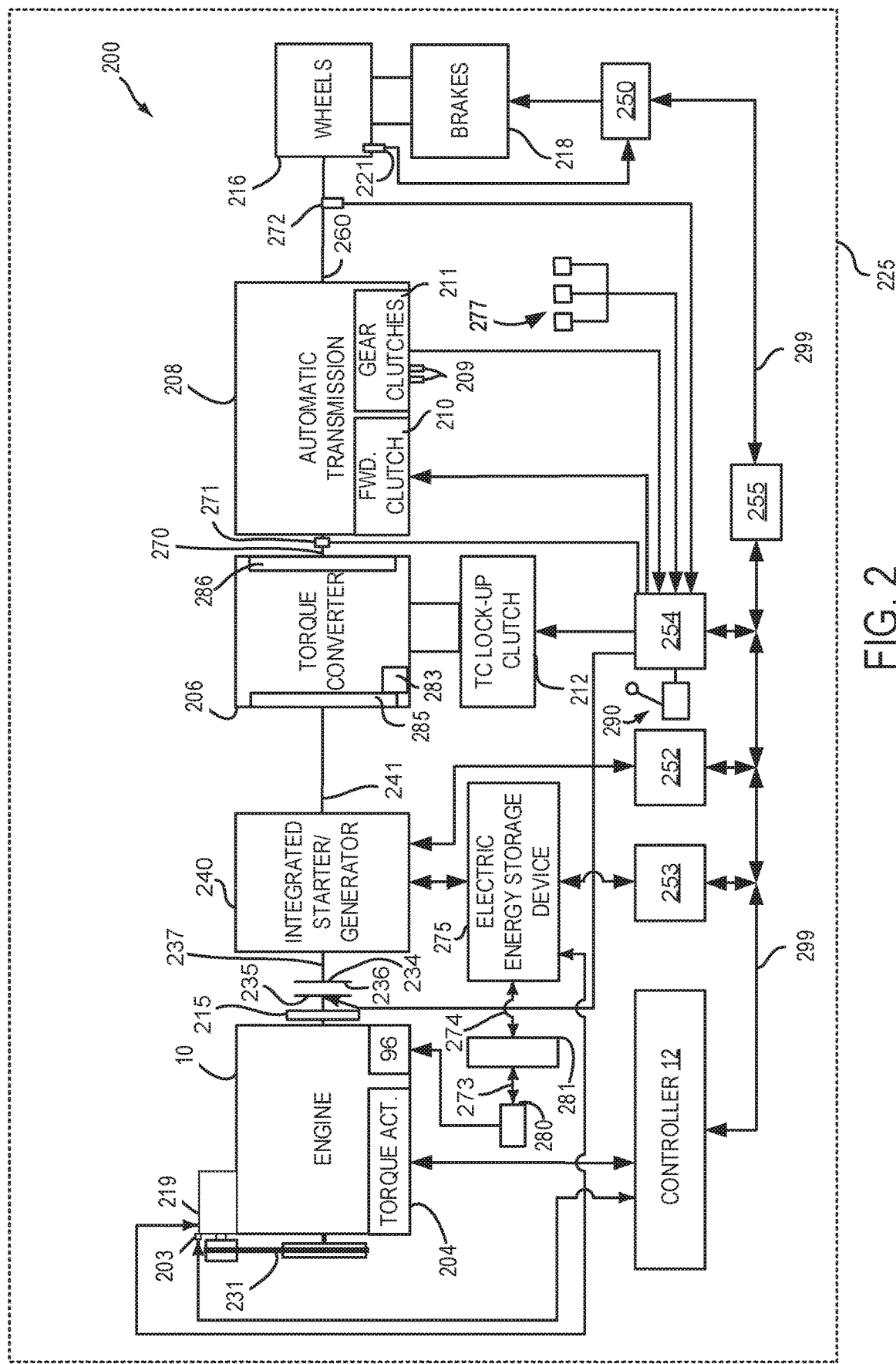
FIG. 2 is a schematic diagram of a hybrid vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of particulate filter 70. Alternatively, a two-state exhaust gas oxygen sensor may be substituted for UEGO sensor 126.

Particulate filter 70 can include multiple bricks and a three-way catalyst coating, in one example. In another example, multiple emission control devices, each with multiple bricks, can be used. A differential pressure across particulate filter 70 may be determined from upstream pressure sensor 71 and downstream pressure sensor 72. The differential pressure sensor may reference a table of empirically determined amounts of soot that may be stored in particulate filter 70. The table output amounts of soot responsive to the pressure drop across the particulate filter 70.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift lever may include positions for gears 1-N (where N is the an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Figure 3:
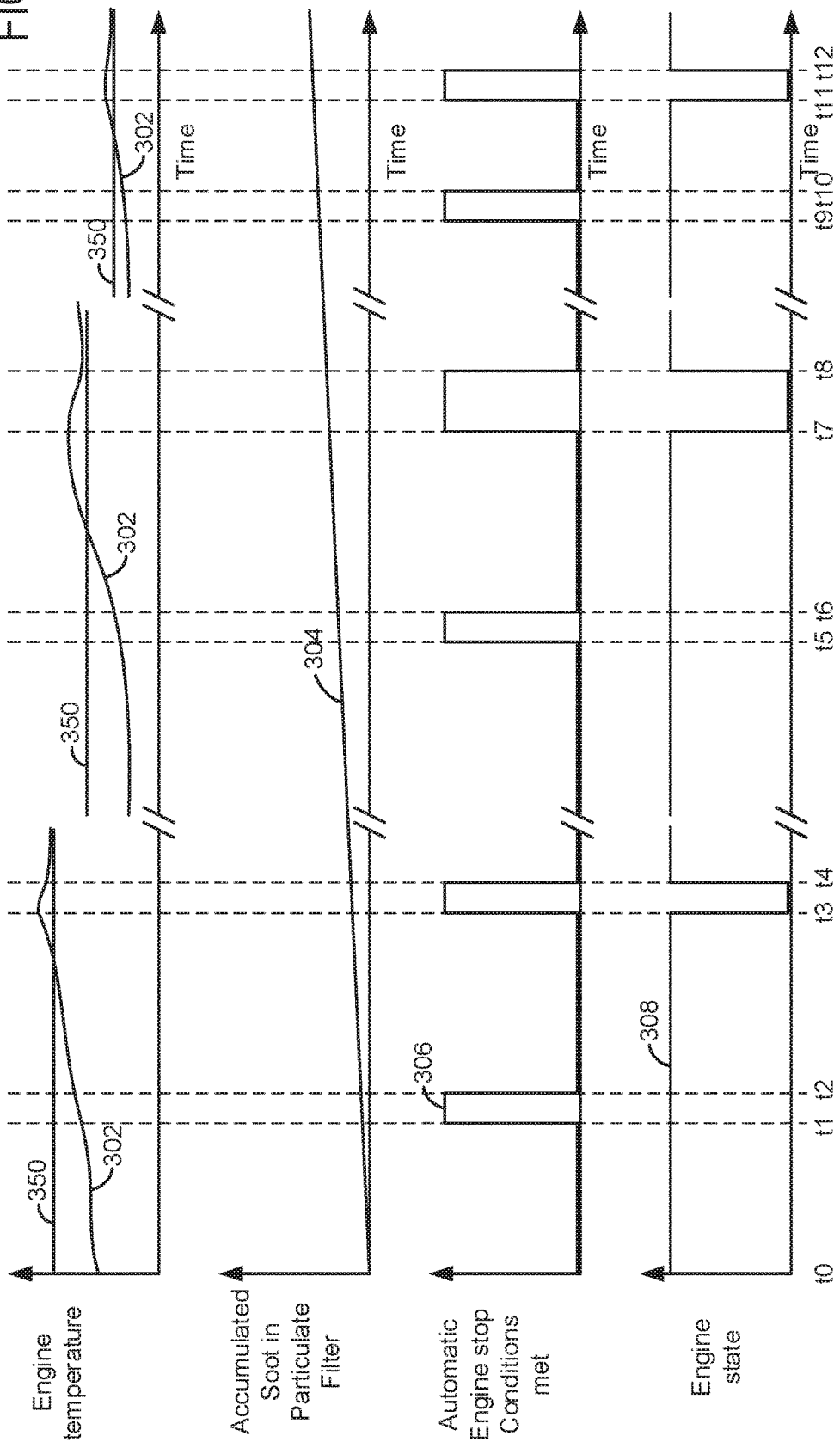
FIG. 3 shows an example driveline operating sequence.

Referring now to FIG. 3, example plots of an engine operating sequence are shown. The operating sequence may be performed via the system of FIGS. 1 and 2 in cooperation with the method of FIG. 4. Vertical lines at times t0-t12 represent times of interest during the sequence. The plots in FIG. 3 are time aligned and occur at the same time. The // marks along the horizontal axis of each plot represent a break in time and the break in time may be long or short in duration.

The first plot from the top of FIG. 3 is a plot of engine temperature versus time. The vertical axis represents engine temperature and engine temperature increases in the direction of the vertical axis arrow. The horizontal axis represents time and time increases from the left side of the figure to the right side of the figure. Solid line 302 represents engine temperature. Line 350 represents an automatic engine stop threshold engine temperature (e.g., a temperature that engine temperature has to exceed for the engine to be automatically stopped).

The second plot from the top of FIG. 3 is a plot of an amount of soot that is accumulated inside of a particulate filter versus time. The vertical axis represents an amount of soot that is accumulated inside of a particulate filter and the amount of soot that is accumulated inside of a particulate filter increases in the direction of the vertical axis arrow. The horizontal axis represents time and time increases from the left side of the figure to the right side of the figure. Solid line 304 represents an amount of soot that is accumulated inside of a particulate filter.

The third plot from the top of FIG. 3 is a plot of a state that indicates when automatic engine stopping conditions, except engine temperature being greater than the automatic engine stopping temperature threshold, are met. Conditions for automatically stopping the engine, except for engine temperature being greater than the automatic engine stopping temperature threshold, are met when trace 306 is at a higher level near the vertical axis arrow. Conditions for automatically stopping the engine, except for engine temperature being greater than the automatic engine stopping temperature threshold, are not met when trace 306 is at a lower level near the horizontal axis. The horizontal axis represents time and time increases from the left side of the figure to the right side of the figure. Solid line 306 represents the conditions for automatically stopping the engine being met, except for engine temperature being greater than the automatic engine stopping temperature threshold.

The fourth plot from the top of FIG. 3 is a plot of engine operating state versus time. The engine operating state is asserted and the engine is operating (e.g., rotating and combusting fuel) when trace 308 is at a higher level near the vertical axis arrow. The engine operating state is not asserted and the engine is not operating (e.g., not rotating) when trace 308 is at a lower level near the horizontal axis. Solid line 308 represents the engine operating state.

At time t0, engine temperature is less than the automatic engine stop threshold engine temperature 350 and the amount of soot that is accumulated in the particulate filter trap is small. Conditions for automatically stopping the engine, except for engine temperature being greater than an automatic engine stopping temperature threshold, are not met and the engine is operating.

At time t1, engine temperature is still less than the automatic engine stop threshold engine temperature 350 and the amount of soot that is accumulated in the particulate filter trap has increased, but it is still small. Conditions for automatically stopping the engine, except for engine temperature being greater than an automatic engine stopping temperature threshold, are met, but the engine continues to operate since engine temperature is less than threshold 350.

At time t2, engine temperature is still less than the automatic engine stop threshold engine temperature 350 and the amount of soot that is accumulated in the particulate filter trap is still small. Conditions for automatically stopping the engine, except for engine temperature being greater than an automatic engine stopping temperature threshold, are no longer met. So, the engine continues to operate.

At time t3, engine temperature has increased and it is greater than the automatic engine stop threshold engine temperature 350. The automatic engine stop threshold engine temperature 350 is a relatively high value since the amount of soot stored in the particulate filter is low, which decreases particulate filter efficiency. The amount of soot that is accumulated in the particulate filter trap has increased a small amount. Conditions for automatically stopping the engine, except for engine temperature being greater than an automatic engine stopping temperature threshold, are met. So, the engine is automatically stopped.

At time t4, engine temperature is still greater than the automatic engine stop threshold engine temperature 350, but automatic engine stopping conditions, except for engine temperature being greater than an automatic engine stopping temperature threshold, are no longer met so, the engine is restarted. The amount of soot that is trapped in the particulate filter has increased by a small amount and the engine is activated at time t4. A break in time occurs between time t4 and time t5.

Between time t4 and time t5, the engine operates and the amount of soot stored in the particulate filter increases. The automatic engine stopping threshold temperature is decreased because the amount of soot stored in the particulate filer has increased, thereby increasing the soot trapping efficiency of the particulate filter.

At time t5, engine temperature is still less than the automatic engine stop threshold engine temperature 350 and the amount of soot that is accumulated in the particulate filter trap has increased to a medium level. Conditions for automatically stopping the engine, except for engine temperature being greater than an automatic engine stopping temperature threshold, are met, but the engine continues to operate since engine temperature is less than threshold 350.

At time t6, engine temperature is still less than the automatic engine stop threshold engine temperature 350 and the amount of soot that is accumulated in the particulate filter trap is still a middle level but it continues increasing. Conditions for automatically stopping the engine, except for engine temperature being greater than an automatic engine stopping temperature threshold, are no longer met. So, the engine continues to operate.

At time t7, engine temperature has increased and it is greater than the automatic engine stop threshold engine temperature 350. The automatic engine stop threshold engine temperature 350 is a middle value since the amount of soot stored in the particulate filter is increased to a middle level, which increases particulate filter efficiency. Conditions for automatically stopping the engine, except for engine temperature being greater than an automatic engine stopping temperature threshold, are met. So, the engine is automatically stopped.

At time t8, engine temperature is still greater than the automatic engine stop threshold engine temperature 350, but automatic engine stopping conditions, except for engine temperature being greater than an automatic engine stopping temperature threshold, are no longer met. So, the engine is restarted. The amount of soot that is trapped in the particulate filter has increased by a small amount and the engine is activated at time t8. A break in time occurs between time t8 and time t9.

Between time t8 and time t9, the engine operates and the amount of soot stored in the particulate filter increases. The automatic engine stopping threshold temperature is decreased because the amount of soot stored in the particulate filer has increased, thereby further increasing the soot trapping efficiency of the particulate filter.

At time t9, engine temperature is still less than the automatic engine stop threshold engine temperature 350 and the amount of soot that is accumulated in the particulate filter trap has increased to a higher level. Conditions for automatically stopping the engine, except for engine temperature being greater than an automatic engine stopping temperature threshold, are met, but the engine continues to operate since engine temperature is less than threshold 350.

At time t10, engine temperature is still less than the automatic engine stop threshold engine temperature 350 and the amount of soot that is accumulated in the particulate filter trap is still a higher level but it continues increasing. Conditions for automatically stopping the engine, except for engine temperature being greater than an automatic engine stopping temperature threshold, are no longer met. So, the engine continues to operate.

At time t11, engine temperature has increased and it is greater than the automatic engine stop threshold engine temperature 350. The automatic engine stop threshold engine temperature 350 is a lower value since the amount of soot stored in the particulate filter is increased to a higher level, which increases particulate filter efficiency. Conditions for automatically stopping the engine, except for engine temperature being greater than an automatic engine stopping temperature threshold, are met. So, the engine is automatically stopped.

At time t12, engine temperature is still greater than the automatic engine stop threshold engine temperature 350, but automatic engine stopping conditions, except for engine temperature being greater than an automatic engine stopping temperature threshold, are no longer met so, the engine is restarted. The amount of soot that is trapped in the particulate filter has increased by a small amount and the engine is activated at time t12.

In this way, the automatic engine stopping threshold temperature may be adjusted as an amount of soot that is stored in a particulate filter increases. The engine may be automatically stopped when engine temperature is greater than the automatic engine stopping threshold temperature and other automatic engine stopping conditions are met.

Referring now to FIG. 4, a flow chart of a method for automatically stopping and starting an engine is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to engine speed, pressure across a particulate filter, hours of engine operation, distance driven by vehicle, engine temperature, engine speed, engine load, and driver demand torque. The engine may operate above or below a threshold temperature for automatically stopping the engine. Method 400 proceeds to 404.

At 404, method 400 estimates an amount of soot that is stored in a particulate filter. In one example, method 400 determines a pressure drop across the particulate filter and references or indexes a table or function of empirically determined soot amounts. The table outputs an amount of soot that is stored in the particulate filter and method 400 proceeds to 406.

At 406, method 400 judges if the amount of soot stored in the particulate filter is greater than a threshold amount. The threshold amount may vary with the volume of the particulate filter. If method 400 judges that the amount of soot stored in the particulate filter is greater than the threshold amount, the answer is yes and method 400 proceeds to 408. Otherwise, the answer is no and method 400 proceeds to 412.

At 408, method regenerates the gasoline engine particulate filter. In one example, the particulate filter is heated via retarding engine spark timing and increasing exhaust flow through the particulate filter. By increasing the particulate filter temperature, soot stored in the particulate filter may be oxidized so that the amount of soot that is stored in the particulate filter may be reduced. Further, the automatic engine stopping temperature may be increased after regenerating the particulate filter so as to maintain tailpipe emissions levels. Method 400 proceeds to 410.

At 410, method 400 estimates an amount of soot that is stored in a particulate filter. Method 400 may determine the amount of soot that remains in the particulate filter via determining a pressure drop across the particulate filter as described at 404. Method 400 proceeds to 412.

At 412, method 400 estimates the efficiency of the gasoline particulate filter to trap soot. In one example, method 400 estimates the particulate filter soot trapping efficiency by indexing or referencing a table or function of empirically determined particulate filter efficiency values (e.g., FIG. 5). The table may be indexed or referenced by the amount of soot stored in the particulate filter. Further, in some examples, the table may be referenced by the distance that the vehicle has driven and the amount of hours that the engine has operated. The particulate filter efficiency may increase as engine operating hours increase and as the distance the vehicle has driven increases. The table outputs an estimate of particulate filter efficiency and method 400 proceeds to 414.

In addition, method 400 may also adjust which fuel injectors are permitted to inject fuel to the engine responsive to the particulate filter efficiency. In one example, method 400 prevents direct fuel injectors from injecting fuel during select engine operating conditions when particulate filter efficiency may be low. For example, method 400 may prevent direct fuel injectors from injecting fuel when engine temperature is less than a threshold temperature. Instead, port fuel injectors may be activated when particulate filter efficiency is less than the threshold efficiency and engine temperature is less than a threshold temperature. The port fuel injectors may reduce particulate emissions when particulate filter efficiency is low and at colder engine temperatures when direct injection may increase soot production. Further, direct injection may be prevented at lower engine loads when particulate filter efficiency is less than a threshold since soot production may be higher at low engine loads when the engine is cold. Direct injection may be permitted at lower engine loads when particulate filter efficiency is greater than the threshold since tailpipe engine emissions may be reduced via the particulate filter.

At 414, method 400 adjusts an automatic engine stop temperature (e.g., an engine temperature at which the engine may be automatically stopped). In one example, the automatic engine stop temperature may decrease as the efficiency of the particulate filter increases so that the engine does not have to reach nominal operating temperature to be automatically stopped. This may allow fuel to be conserved. The automatic engine stop temperature may increase as the efficiency of the particulate filter decreases so that the engine may be automatically stopped at higher engine temperatures so that when the engine is automatically started at higher temperatures, the engine may produce less soot. Producing less soot when the engine is restarted may reduce overall particulate emissions. The automatic engine stop temperature may be determined via referencing a table or function of empirically determined automatic engine stopping temperatures via particulate filter soot trapping efficiency (e.g., FIG. 5). Method 400 proceeds to 416 after adjusting the automatic engine stopping temperature.

At 416, method 400 judges if conditions are present for automatically stopping the engine. The engine may be automatically stopped if engine temperature is greater than the automatic engine stop temperature. In addition, method 400 may also require that driver demand be less than a threshold driver demand to automatically stop the engine. Further, battery state of charge may be required to be greater than a threshold battery state of charge to permit automatic engine stopping. If conditions are present for automatic engine starting, the answer is yes and method 400 proceeds to 418. Otherwise, the answer is no and method 400 proceeds to exit.

At 418, the engine is automatically stopped. The engine may be automatically stopped without a human driver requesting an engine stop via a dedicated pushbutton or key switch by ceasing to supply fuel to engine cylinders. Further, spark delivery may be stopped to engine cylinders. Method 400 proceeds to 420 after automatically stopping the engine.

At 420, method 400 judges if automatic engine starting conditions have been met. Automatic engine starting conditions may include driver demand exceeding a threshold demand or battery state of charge being less than a threshold battery state of charge. If conditions for automatically starting the engine are met, the answer is yes and method 400 proceeds to 422. Otherwise, the answer is no and method 400 remains at 420. Method 400 may also exit if a human driver deactivates the vehicle.

At 422, method 400 automatically starts the engine. The engine may be started via rotating the engine via a starter or via an integrated starter/generator or a different electric machine. Further, fuel and spark are supplied to the engine. Method 400 proceed to exit after the engine is automatically started.

In this way, automatic engine stopping may be allowed or prevented in response to soot trapping efficiency of a particulate filter. Further, direct fuel injection may be allowed or prevented in response to soot trapping efficiency of the particulate filter.

Thus, the method of FIG. 4 provides for an engine operating method, comprising: adjusting an automatic engine stopping engine temperature threshold as a function of an amount of soot stored in a particulate filter via a controller; and automatically stopping an engine responsive to an engine temperature being greater than or equal to the automatic engine stopping engine temperature threshold. The method further comprises operating an engine at a temperature above the automatic engine stopping engine temperature threshold. The method includes where adjusting the automatic engine stopping engine temperature threshold includes decreasing the automatic engine stopping engine temperature threshold as the amount of soot stored in the particulate filter increases. The method includes where adjusting the automatic engine stopping engine temperature threshold includes increasing the automatic engine stopping engine temperature threshold as the amount of soot stored in the particulate filter decreases. The method includes where the particulate filter is in an exhaust system of a spark ignition engine. The method also includes where automatically stopping the engine includes ceasing fuel flow to the engine. The method further comprises estimating the amount of soot stored in the particulate filter via a pressure drop across the particulate filter.

The method of FIG. 4 also provides for an engine operating method, comprising: automatically stopping an engine only when a temperature of the engine is greater than a first temperature before regeneration of a particulate filter; and automatically stopping the engine only when the temperature of the engine is greater than a second temperature after regeneration of a particulate filter, the second temperature less than the first temperature. The method further comprises regenerating the particulate filter in response to an amount of soot stored in the particulate filter exceeding a threshold level. The method further comprises automatically restarting the engine in response to a driver demand torque greater than a threshold. The method further comprises estimating an amount of soot stored in the particulate filter. The method further comprises adjusting a temperature threshold that is compared against the temperature of the engine. The method includes where adjusting the temperature includes increasing the temperature as an amount of soot stored in the particulate filter decreases. The method includes where adjusting the temperature includes decreasing the temperature as an amount of soot stored in the particulate filter increases.

Referring now to FIG. 5, a plot of an example relationship (e.g., function) between an amount of soot trapped in a particulate filter and soot trapping efficiency of the particulate filter is shown. Curve 502 shows that soot trapping efficiency of the particulate filter increases as the amount of soot trapped in the particulate filter increases. Therefore, the particulate filter may trap more soot so that engine tailpipe emissions may still be low even if an engine is operated at lower temperatures with direct injectors that are operating. This may improve the ability of the engine to meet performance and emissions objectives.

Referring now to FIG. 6, a plot of an example relationship (e.g., function) between particulate filter soot trapping efficiency and automatic engine stopping temperature is shown. Curve 602 shows that automatic engine stopping temperature is higher when soot trapping efficiency of the particulate filter is lower so that the engine may be restarted at a higher temperature so that the engine may produce less soot, thereby reducing tailpipe soot emissions. The engine may be automatically stopped at lower engine temperatures when soot trapping efficiency of the particulate filter is higher so that engine fuel efficiency may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. An engine operating method, comprising:
adjusting an automatic engine stopping engine temperature threshold as a function of an amount of soot stored in a particulate filter via a controller; and
automatically stopping an engine responsive to an engine temperature being greater than or equal to the automatic engine stopping engine temperature threshold.

2. The method of claim 1, further comprising operating the engine at a temperature above the automatic engine stopping engine temperature threshold.

3. The method of claim 1, where adjusting the automatic engine stopping engine temperature threshold includes decreasing the automatic engine stopping engine temperature threshold as the amount of soot stored in the particulate filter increases.

4. The method of claim 1, where adjusting the automatic engine stopping engine temperature threshold includes increasing the automatic engine stopping engine temperature threshold as the amount of soot stored in the particulate filter decreases.

5. The method of claim 1, where the engine is a spark ignition engine and where the particulate filter is in an exhaust system of the engine.

6. The method of claim 1, where automatically stopping the engine includes ceasing fuel flow to the engine.

7. The method of claim 1, further comprising estimating the amount of soot stored in the particulate filter via a pressure drop across the particulate filter.

8. A system, comprising:
a spark ignition engine;
a particulate filter in an exhaust system of the spark ignition engine; and
a controller including executable instructions stored in non-transitory memory to adjust a temperature threshold at which the spark ignition engine automatically stops according to an amount of soot stored in the particulate filter, and instructions to automatically stop the spark ignition engine.

9. The system of claim 8, where the instructions to automatically stop the spark ignition engine include instructions to automatically stop the spark ignition engine when a temperature of the spark ignition engine exceeds the temperature threshold at which the spark ignition engine automatically stops.

10. The system of claim 8, further comprising additional instructions to prevent automatic engine stopping when a temperature of the spark ignition engine is less than the temperature threshold at which the spark ignition engine automatically stops.

11. The system of claim 8, further comprising additional instructions to automatically start the spark ignition engine.

12. The system of claim 8, where adjusting the temperature threshold includes increasing the temperature threshold as the amount of soot stored in the particulate filter decreases.

13. The system of claim 8, where adjusting the temperature threshold includes decreasing the temperature threshold as the amount of soot stored in the particulate filter increases.

14. A method, comprising:
flowing exhaust from a spark ignition engine through a particulate filter;
estimating an efficiency of the particulate filter;
adjusting an automatic engine stop temperature threshold based on the efficiency of the particulate filter; and
responsive to one or more engine stop conditions being met, automatically stopping the spark ignition engine, wherein the one or more engine stop conditions comprise a temperature of the spark ignition engine being greater than or equal to the automatic engine stop temperature threshold.

15. The method of claim 14, wherein the one or more engine stop conditions further comprise a driver demand torque being less than a torque threshold and/or a state of charge of a battery coupled to the spark ignition engine being greater than a threshold state of charge.

16. The method of claim 14, further comprising, responsive to one or more engine restart conditions being met, automatically restarting the spark ignition engine following automatically stopping the spark ignition engine.

17. The method of claim 16, wherein the one or more engine restart conditions comprise a driver demand torque being greater than a torque threshold and/or a state of charge of a battery coupled to the spark ignition engine being less than a threshold state of charge.

18. The method of claim 14, further comprising, responsive to each of the efficiency of the particulate filter being less than a threshold efficiency and the temperature of the spark ignition engine being less than the automatic engine stop temperature threshold, injecting fuel to the spark ignition engine via port fuel injectors, and preventing direct fuel injectors from injecting fuel to the spark ignition engine.

19. The method of claim 14, wherein adjusting the automatic engine stop temperature threshold comprises increasing the automatic engine stop temperature threshold as the efficiency of the particulate filter increases.

20. The method of claim 14, wherein adjusting the automatic engine stop temperature threshold comprises decreasing the automatic engine stop temperature threshold as the efficiency of the particulate filter decreases.

* * * * *